United States Patent [19]

Thompson

[11] Patent Number: 4,885,012

[45] Date of Patent: Dec. 5, 1989

[54] ROTARY SCREEN FOR PNEUMATIC GRAIN HANDLING

[76] Inventor: Andy L. Thompson, R.R. 1, Courtland, Kans. 66939

[21] Appl. No.: 296,935

[22] Filed: Jan. 17, 1989

[51] Int. Cl.$^4$ .................. B81D 50/00; B65G 53/40
[52] U.S. Cl. ........................ 55/290; 55/337; 55/432; 55/459.1; 55/467; 406/67; 406/109; 406/173
[58] Field of Search ............... 55/290, 320, 328, 337, 55/431, 432, 459.1, 467, 492; 406/53, 57, 109, 171, 173

[56] References Cited

U.S. PATENT DOCUMENTS

| | | | |
|---|---|---|---|
| 3,002,585 | 10/1961 | Pasturczak | 55/290 |
| 3,475,883 | 11/1969 | Sullivan | 55/290 |
| 3,955,236 | 5/1976 | Mekelburg | 15/314 |
| 4,218,226 | 8/1980 | Boozer | 55/274 |
| 4,411,674 | 10/1983 | Forgac | 55/304 |
| 4,482,367 | 11/1984 | Howeth | 55/304 |
| 4,572,726 | 2/1986 | Van Abbema | 55/337 |
| 4,599,016 | 7/1986 | Medemblik | 406/67 |
| 4,662,800 | 5/1987 | Anderson et al. | 406/53 |

OTHER PUBLICATIONS

WALINGA AGRI-VAC Sales Brochure, Jun. 1987, Distributed by Thompson Walinga Sales & Service, Courtland, Kans.

*Primary Examiner*—Charles Hart

[57] ABSTRACT

A rotary screen assembly for a pneumatic grain handling device is described which is comprised of a perforated cylindrical screen member rotatably driven by a propeller means which is placed in the airstream of the device. The screen assembly includes a cut-off plate positioned at the bottom inside surface of the screen member for interrupting airflow through a portion of the screen member thereby creating a continuous cleaning action of the screen assembly. The screen assembly is particularly useful for preventing abrasive airborne particles from entering into and damaging the blower components.

14 Claims, 2 Drawing Sheets

ROTARY SCREEN FOR PNEUMATIC GRAIN HANDLING

This invention relates to pneumatic conveyance devices, and in particular such devices used to transfer agricultural grains such as corn, soybeans and the like.

BACKGROUND OF THE INVENTION

Pneumatic conveyance devices for agricultural applications have been known for some time. These devices commonly employ a fan or blower to create a vacuum for sucking grain or other granular material into a cyclonic receptacle from one location and transferring the material through an outlet of the receptacle to a second location by means of compressed air provided by the same fan or blower. Because these pneumatic conveyance devices rely on a moving airstream to effect the transfer of granular material, many smaller or lighter particles associated with the granular material become airborne. These airborne particles tend to follow the airflow through the cyclonic receptacle to the intake of the blower. Often these airborne particles are abrasive and, therefore, cause premature wear to the air moving blower components. In agricultural applications, this excessive wear problem is especially serious when dealing with grains such as white beans or soybeans which are often grown in a sandy soil and, hence, tend to have a considerable amount of particulate sand associated therewith. However, all types of grains have a certain amount of foreign material such as chaff and weed seeds which tend to follow the airstream through the blower components.

Because of the large volumes of air used by these pneumatic devices, it is not practical to use a conventional filter to remove unwanted airborne particles from the air entering the blower. A conventional filter would rapidly become clogged and restrict airflow to the blower. Cyclone arrangements have been used to separate particulate matter from the airstream leaving a collecting receptacle of a device of this type. The particles are forced to the walls of the cyclone and gravitationally fall to a receptacle out of the airstream.

For example, U.S. Pat. No. 3,955,236 dated May 11, 1976, describes a vacuum collector system for gravel, wherein the gravel is sucked into a first compartment, the outlet of which is connected to a cyclone separator for removing dust from the airstream entering the pump. Also, U.S. Pat. No. 4,218,226 dated Aug. 19, 1980, describes a vacuum apparatus for particulate matter having a similar arrangement of components including a cyclone for cleaning the air entering the fan.

It has been found that the use of a single cyclone to clean air being drawn into a blower of a pneumatic conveyance apparatus is often not effective to remove sufficient abrasive particulate matter to prevent premature wear to the blower components. This is especially true in those devices employing a blower which comprises a high pressure positive displacement air pump having air moving components comprising precisely machined interengaging surfaces.

More recently, a cyclone arrangement described in U.S. Pat. No. 4,599,016 dated July 8, 1986 has been used to effectively remove a larger amount of the airborne particles from the airstream leaving the collecting receptacle. This cyclone arrangement includes a primary cyclone and a secondary cyclonic air cleaner wherein the secondary cleaner is positioned inside the primary cyclone and is provided with its own collecting container. The main problems experienced with this secondary cyclonic air cleaner are the limited capacity of the collecting container and the increased restriction in the airstream due to cyclonic airflow. When it is desired to move a large quantity of grain having excessive foreign material with this cyclone arrangement, it may be necessary to interrupt the operation repeatedly in order to empty the secondary collecting container.

SUMMARY OF THE INVENTION

The present invention addresses these problems by providing a rotary screen, in addition to a primary cyclone, for cleaning air being drawn into a blower used in a pneumatic conveyance device of the type described. This rotary screen is adapted to be rotatably driven by a propeller means which effectively harnesses power out of the airstream leaving the primary cyclone. The rotary screen preferably is provided with a cut-off plate for interrupting airflow through a portion of the screen as the screen passes by the cut-off plate. This allows for a continuous self-cleaning action of the screen, thereby eliminating any interruptions in operation of the conveyance device.

Accordingly, the present invention provides a pneumatic conveyance apparatus for moving granular matter, comprising an enclosed container having a lower cyclone portion and an upper portion defined by an internal partition having an aperture therethrough for allowing communication between the portions. The container has at least one inlet for sucking air and granular matter into the lower cyclone portion, and has an outlet for exhausting air from the upper portion. A valve and duct means, commonly referred to as an air lock, is provided for conveying granular matter collected in the lower cyclone portion therefrom. A blower is connected between the container outlet and the valve and duct means for creating a partial vacuum in the container and an elevated pressure at the valve and duct means. A rotary screen is provided for cleaning the air leaving the container and entering the blower, comprising a cylindrical perforated screen member rotatably driven by a propeller means placed in the airstream and including a means for cutting off airflow through a portion of the screen to allow the screen to be continuously self-cleaning.

Particulars of a preferred embodiment of the pneumatic conveyance apparatus of the present invention follow with reference being made to the drawings.

Figure 1:
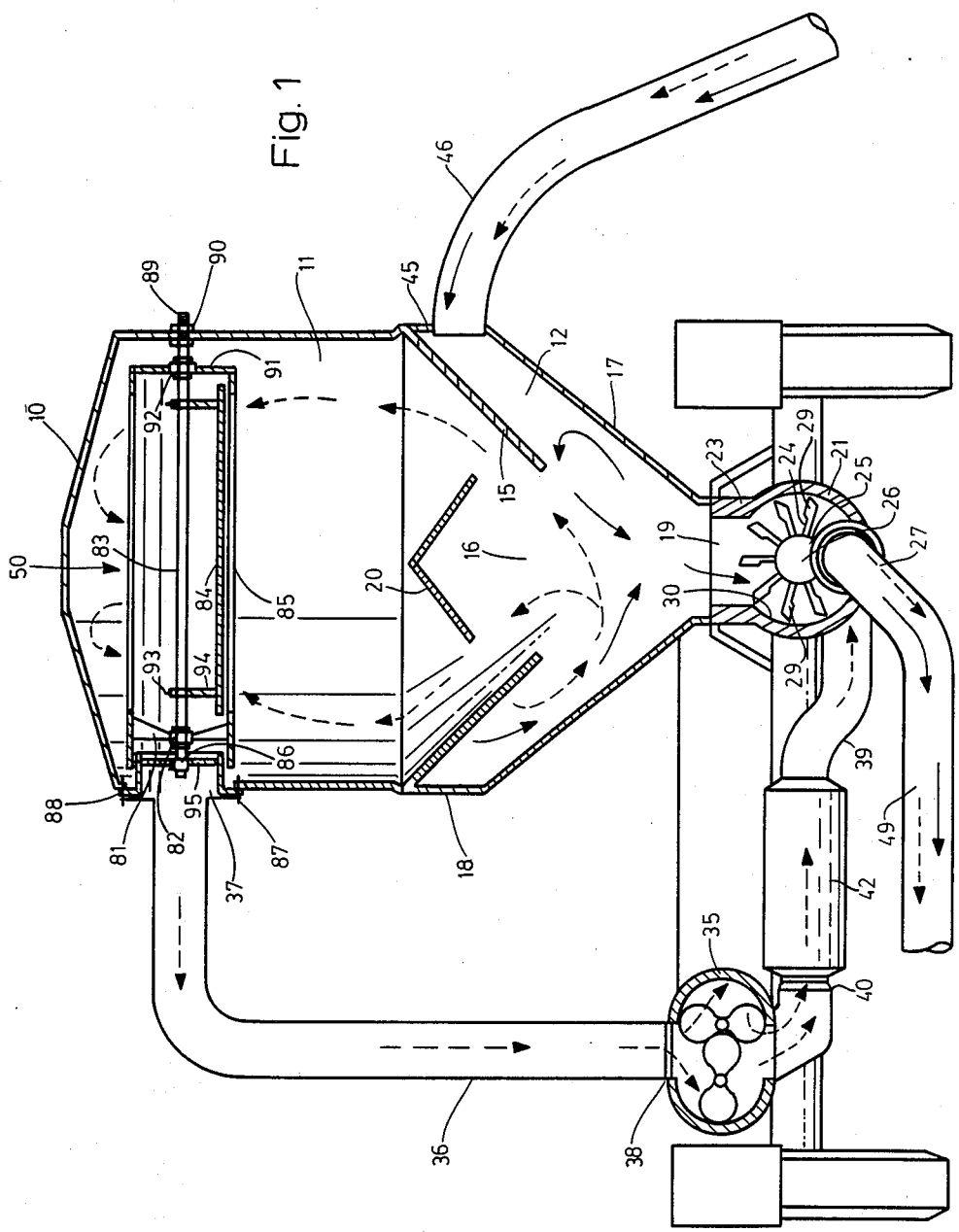
FIG. 1 is a cross sectional view of the container, blower, valve and duct means and the preferred embodiment of the rotary screen.
Figure 2:
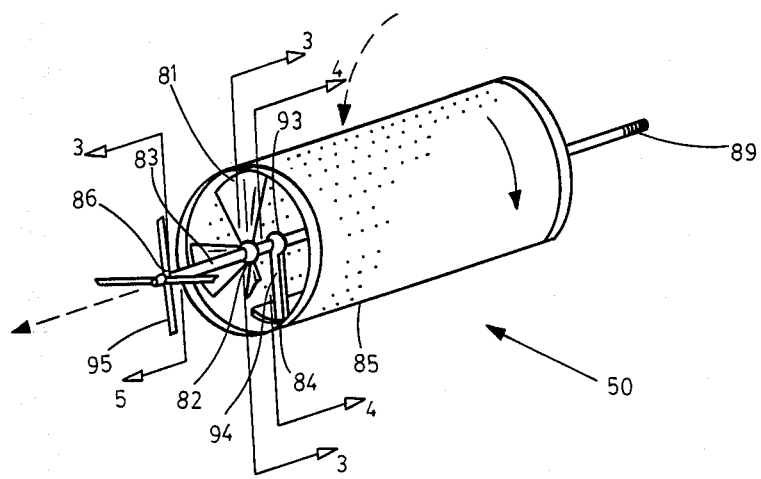
FIG. 2 is a perspective view, partially broken away, of the preferred structure of the rotary screen.
Figure 5:
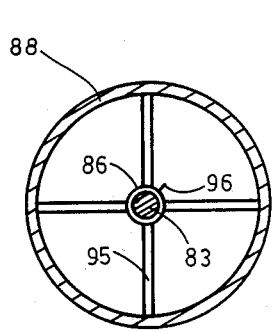
FIGS. 3-5 are sectional views taken along corresponding lines in FIG. 2.
Figure 3:
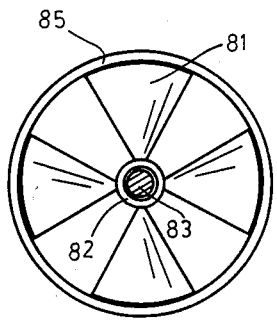
Figure 4:
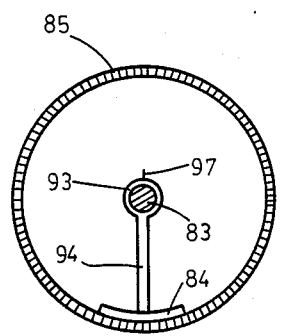

Airflow is represented as broken arrows in FIG. 1 while grain flow is generally represented by solid arrows.

DETAILED DESCRIPTION OF THE INVENTION

A pneumatic conveyance apparatus in accordance with the present invention is shown in FIG. 1. The apparatus comprises a container 10 having an upper portion 11 and a lower cyclone portion 12 defined by a partition 15 provided within the container 10. The lower portion 12 has a frustoconical shaped lower surface 17 and a cylindrical side surface 18, both of which combine with the downward extending frustoconical shaped partition 15 to encourage cyclonic movement of air within the portion 12. The partition 15 defines an aperture 16 which allows for communication between the upper and lower portions 11 and 12. An inverted conical shaped shield 20 is fixed above the aperture 16 and provides a means for restricting grain flow upwardly into the upper portion 11 of the container 10. The lower surface 17 defines an opening 19 for communication with a valve and duct means 21 which is used for moving granular matter collected in the lower portion 12 therefrom.

The valve and duct means 21 preferably comprises an air-sealed rotary valve 23 having a plurality of vanes 24 extending radially from a hub 25 which rotates about an axis 26 for moving granular matter from the lower portion 12 to a duct 27. The vanes 24 are provided with flexible or adjustable tips 29 which sealingly engage the inner surface 30 of the valve 23 to provide an air seal between the duct 27 and the lower portion 12.

An air pump or blower 35 is connected between the upper portion 11 and the duct 27 for creating a partial vacuum in the container 10 and an elevated pressure at the duct 27. Preferably, the blower 35 comprises a positive displacement blower but a fan-type blower is also suitable. A conduit 36 connects an outlet 37 of the upper portion 11 of the container 10 to an inlet 38 of the blower 35. Likewise, a conduit 39 connects an outlet 40 of the blower 36 to one end of the duct 27. To reduce noise, a muffler 42 may be provided in the conduit 39.

The container 10 is provided with an inlet 45 which is positioned tangentially to the cylindrical side of the lower cyclone portion 12. A conduit 46, such as a flexible hose, may be attached to the inlet 45 to provide means for sucking up granular matter for delivery to the inlet 45. Likewise, the exit end of the duct 27 may be provided with a flexible conduit 49 for directing the deposition of granular material expelled from the lower portion 12 and duct 27. The above described device is conventional and well known in the art.

In a preferred embodiment of the present invention, the upper portion 11 of the container 10 is equipped with a rotary screen assembly 50 for cleaning the air before it enters the blower 35. As shown in FIG. 1, the rotary screen assembly 50 comprises a horizontally disposed cylindrical shaped perforated screen 85 rotatably mounted on a stationary shaft 83. A propeller 81 is mounted to a first end of the screen such as to be driven by the air passing through the screen and exiting the container 10. The propeller 81 supports the first end of the screen 85 and is rotatably mounted to the shaft 83 through a roller bearing 82. The other end of the screen 85 is supported by an end plate 91 which is rotatably mounted to the shaft 83 through a second roller bearing 92. The shaft 83 is threaded at the end 89 opposite the propeller 81 and extends through an aperture in the side wall of the container 10. Threaded nuts 90 are provided on each side of the sidewall and are tightened to fix the shaft in a stationary position. The other end of the shaft 83 is rigidly supported by a locking collar 86 and arms 95 which are fixed to a mounting member 88. The mounting member 88 is fixed to the container 10 by bolts 87. A portion of the mounting member 88 is of a cylindrical shape and fits inside the screen 85 to provide an air seal around the peripheral edge of the first end of the screen. The end plate 91 provides an air seal at the other end of the screen so that the air flow is forced through the perforated part of the screen. It has been found that a screen member having 83/32 inch diameter holes per linear inch is well suited for removing airborne particles while conveying grain such as corn.

A cut-off plate 84 is rigidly suspended by supports 94 which are fixed to the shaft 83 by locking collars 93. The locking collars 93 are each provided with a set screw 97. The cut-off plate 84 has an arcuate configuration and is positioned closely adjacent the inside surface of the bottom of the screen 85. As with the air-sealing portion of the mounting member 88, the cut-off plate should be positioned as close to the screen as possible without actually touching it, in order to keep friction effects to a minimum while providing the best possible air seal. The installation and removal of the screen assembly 50 is designed to be extremely simple, thereby minimizing labor-requirements for maintenance and repair. By removing bolts 87 and the outside nut 90 from the shaft 83, the entire assembly 50 can be slid out of the container 10 through the opening at 37.

In operation of the preferred embodiment, the incoming airstream passes through the upper sides and top portion of the screen 85 and travels through the interior of the screen to the propeller 81. The air stream passing over the blades of the propeller 81 causes the propeller, along with the screen 85, to freely rotate about the shaft 83. The associated airborne particles are effectively restricted from passing through the screen 85 due to the size of the perforations therein. As the screen 85 rotates past the cut-off plate 84, the airflow through the screen is briefly interrupted, causing the particles to fall away from the screen. Both centrifugal and gravitational forces on the surface of the screen play a key role in this process. The result is a continuously self-cleaning screen which is well adapted for filtering out damaging airborne particles from the airstream entering the blower 35 of a conventional pneumatic grain handling device.

It has also been contemplated to use a combination of the present rotary screen invention in series with a secondary cyclonic air cleaner such as that disclosed in U.S. Pat. No. 4,599,016. The main advantage of such an arrangement would be in the ability of the secondary cyclonic air cleaner to remove the very small airborne particles which pass through the perforations in the screen member.

Various other modifications of the invention will become apparent to those skilled in the art and the invention is accordingly not limited to the preferred embodiment only but includes those modifications and variations within the scope and spirit of the appended claims.

I claim:

1. A pneumatic conveyance apparatus for moving granular matter, comprising:
   an enclosed container having a lower cyclone portion and an upper portion defined by an internal partition having an aperture therethrough allowing communication between the portions, said container having at least one inlet for sucking air and granular matter into the lower cyclone portion, and having an outlet for exhausting air from the upper portion;
   valve and duct means for conveying granular matter collected in the lower cyclone portion therefrom;

a blower connected between the container outlet and the valve and duct means for creating a partial vacuum in the container and an elevated pressure at the valve and duct means; and a rotary screen assembly provided in the upper portion of the container for removing airborne particles from the air leaving the container and entering the blower, said screen assembly comprising a generally cylindrical shaped perforated screen member rotatably mounted with respect to the container, said screen member supported by an elongated shaft member, a propeller means operatively connected to the screen member, said propeller means located in the airstream at the outlet of the container and rotatively driven by said airstream, whereby rotary motion is imparted to the screen member, said airstream passing through perforations in the screen member radially inwardly.

2. An apparatus as claimed in claim 1, wherein the screen assembly further comprises a cut-off plate suspended from said shaft member and positioned closely adjacent the inside surface of the screen member, said cut-off plate continuously interrupting airflow through a portion of the screen member, thereby causing particles to fall from the outer surface of said portion of the screen member.

3. An apparatus as claimed in claim 2, wherein the cut-off plate is an arcuate shaped plate.

4. An apparatus as claimed in claim 3, wherein each end of the shaft member is fixed to the container, the ends of the screen member are rotatably mounted to the shaft member through a first and second bearing, and the propeller means comprises a propeller which is fixed to the screen member, whereby rotation of the propeller causes rotation of the screen member.

5. An apparatus as claimed in claim 3, wherein the shaft member and the screen member are coaxial and horizontally disposed and wherein the cut-off plate is positioned adjacent the bottom inside surface of the screen member.

6. An apparatus as claimed in claim 4, wherein the shaft member and the screen member are coaxial and horizontally disposed and wherein the cut-off plate is positioned adjacent the bottom inside surface of the screen member.

7. An apparatus as claimed in claim 6, wherein each end of the screen assembly is provided with an air seal means for restricting airflow from entering the ends of the screen member.

8. An apparatus as claimed in claim 7, wherein the air seal means at the end of the screen assembly adjacent the propeller means is comprised of a cylindrical member positioned closely adjacent the inside surface of the screen member.

9. An apparatus as claimed in claim 8, wherein the upper portion of said container includes an opening for removing the screen assembly for maintenance and repair.

10. A rotary screen assembly for use in a pneumatic conveyance apparatus, comprising:

a generally cylindrical shaped perforated screen member rotatably mounted inside said conveyance apparatus for removing airborne particles from the airstream entering a blower means, said airstream passing through perforations in the screen member radially inwardly;

an elongated shaft member mounted coaxially inside the screen member for rotatably supporting said screen member;

a propeller means operatively connected to the screen member, said propeller means located in the airstream generally between said screen member and said blower and rotatively driven by said airstream, whereby rotary motion is imparted to the screen member;

a cut-off plate suspended from said shaft member and positioned closely adjacent the inside surface of the screen member, said cut-off plate for interrupting airflow through a portion of the screen member, thereby causing particles to fall from the outer surface of said screen member.

11. A rotary screen assembly as claimed in claim 10, wherein each end of the shaft member is fixed to the conveyance apparatus and the ends of the screen member are rotatably mounted to the shaft member through a first and second bearing, and the propeller means comprises a propeller which is fixed to the screen member, whereby rotation of the propeller causes rotation of the screen member.

12. A rotary screen assembly as claimed in claim 11, wherein the shaft member and the screen member are coaxial and horizontally disposed, and wherein the cut-off plate is positioned adjacent the bottom inside surface of the screen member.

13. A rotary screen assembly as claimed in claim 12, wherein each end of said screen assembly is provided with an air seal means for restricting airflow from entering the ends of the screen member.

14. An apparatus as claimed in claim 13, wherein the air seal means at the end of the screen assembly adjacent the propeller means is comprised of a cylindrical member positioned closely adjacent the inside surface of the screen member.

* * * * *